United States Patent [19]

Nelson et al.

[11] Patent Number: 4,933,530

[45] Date of Patent: Jun. 12, 1990

[54] METHOD FOR REPAIRING A REFRIGERATION SEALED SYSTEM

[75] Inventors: John A. Nelson, Benton Township, Berrien County; Thomas R. Mac Farlane, St. Joseph, both of Mich.

[73] Assignee: Whirlpool Corporation, Benton Harbor, Mich.

[21] Appl. No.: 158,320

[22] Filed: Feb. 22, 1988

Related U.S. Application Data

[62] Division of Ser. No. 879,145, Jun. 26, 1986, abandoned.

[51] Int. Cl.$^5$ ............................................. B23K 9/28
[52] U.S. Cl. ............................... 219/85.16; 219/85.1; 219/85.15
[58] Field of Search ............... 285/287; 219/85 CA, 219/85 CM, 85 R

[56] References Cited

U.S. PATENT DOCUMENTS

| | | |
|---|---|---|
| 1,617,354 | 2/1925 | Reynolds . |
| 1,807,004 | 5/1931 | Nelson . |
| 1,869,448 | 8/1932 | Woodring . |
| 2,183,908 | 12/1939 | Gladitz . |
| 2,243,086 | 5/1941 | Buettell . |
| 3,750,248 | 8/1973 | Morris ............................ 285/287 |
| 4,158,763 | 6/1979 | Moerke . |
| 4,227,066 | 10/1980 | Bulwidas, Jr. . |
| 4,367,397 | 1/1983 | Henderson . |
| 4,656,336 | 4/1987 | Goodey ........................ 219/85 CA |

OTHER PUBLICATIONS

Instant 3000 Heat Advertising Brochure, The Sting Operating Instructions.

*Primary Examiner*—Leo P. Picard
*Assistant Examiner*—L. Donovan
*Attorney, Agent, or Firm*—Jeffers, Hoffman & Niewyk

[57] ABSTRACT

A method and apparatus for bonding two tubes in a refrigeration sealed system by soldering. The apparatus includes a pair of jaws which are spring biased in the closed position and a pair of handles for opening the jaws against the spring bias force. The jaws include electrodes having arcuate recesses therein which are arranged in opposed facing aligned relationship so that a pair of tubes may be held between the electrodes. One of the pair of tubers to which the method is applied has a flared end with a larger diameter than the other tube. The ends of the tubes are first cleaned by mechanical means and flux is then applied to the end of the smaller tube. The end of the smaller tube is then slid into the flared end of the other tube in telescoping registry and the telescoped ends are clamped between the electrodes. A solder ring is then positioned around the smaller tube into abutting relationship with the flared end of the other tube. Electric current is supplied to the electrodes to heat the telescoped tube ends so that the flux will melt and cause it to further clean the tube ends. The heat will also melt the solder which is then drawn into the interface area between the telescoped tube ends.

6 Claims, 3 Drawing Sheets

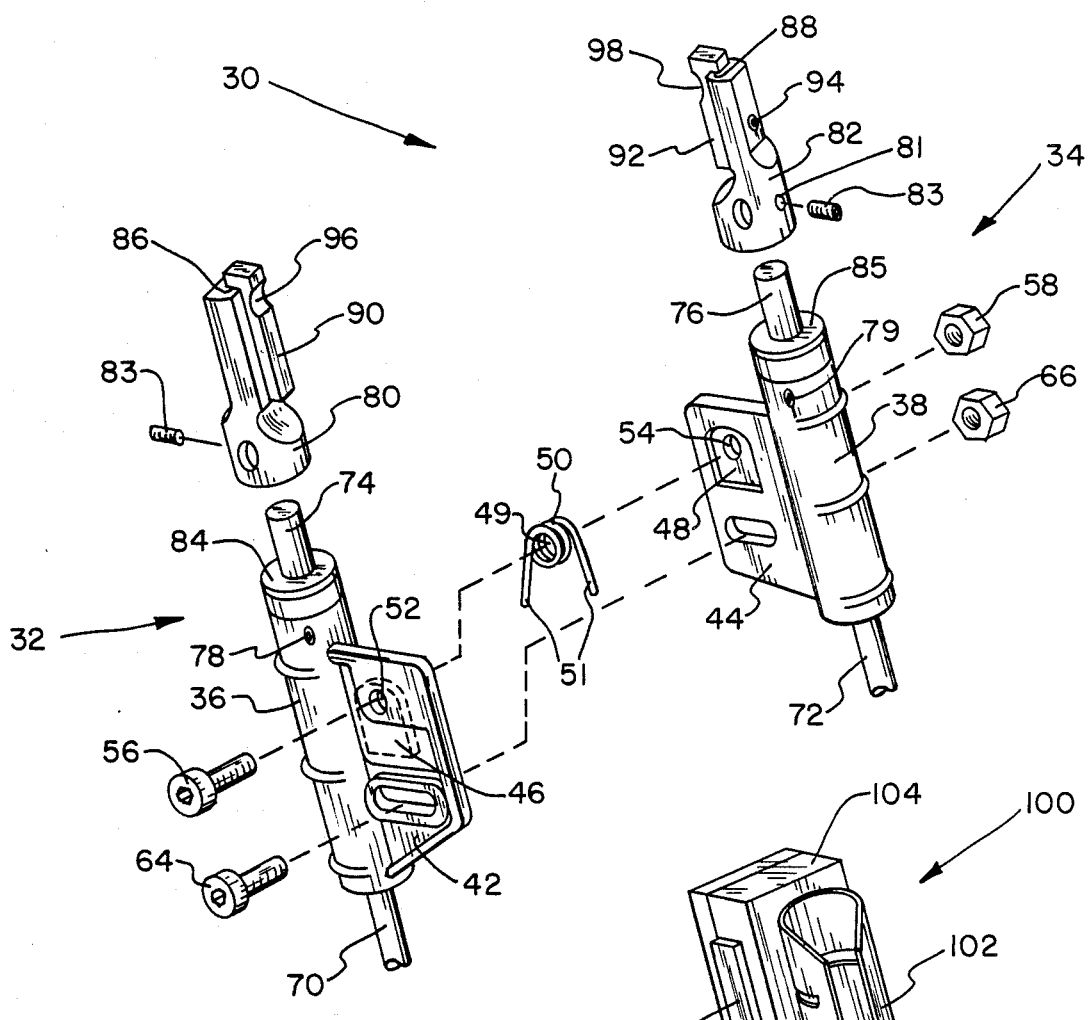
FIG. 4
FIG. 5
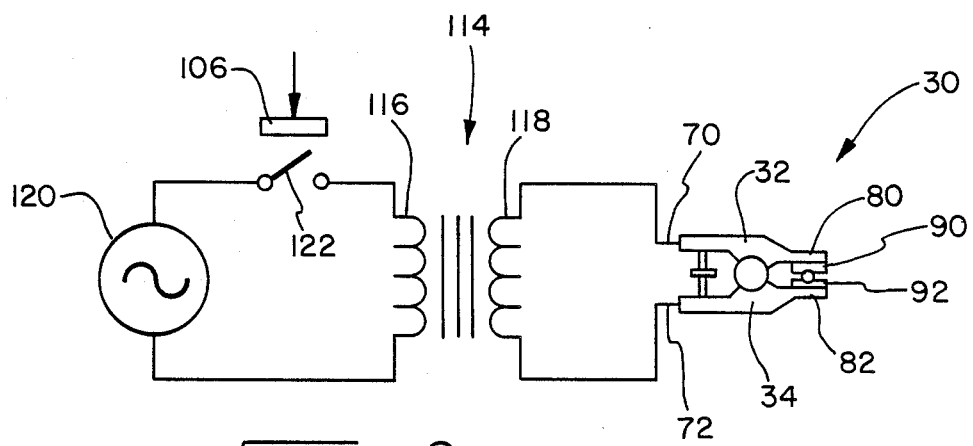
FIG. 8

METHOD FOR REPAIRING A REFRIGERATION SEALED SYSTEM

This is a division of application Ser. No. 879,145, filed June 26, 1986 now abandoned.

BACKGROUND OF THE INVENTION

This invention relates to a method and apparatus for joining metallic tubular members by soldering to form a secure leakproof joint. Specifically, this application relates to a method and apparatus for repairing a refrigeration sealed system without the use of a conventional open flame oxygen acetylene torch for making a secure leakproof solder joint between two metallic tubes.

Home appliances which include sealed refrigeration systems, such as refrigerators, freezers, room air conditioners, and the like, occasionally experience failed components, which must then be replaced. To repair such refrigeration systems, the failed component must be removed by cutting or otherwise disconnecting the refrigerant tubes leading to the failed component, removing the failed component, and installing a new component including connecting the new component to the system refrigerant tubes. A conventional method for connecting refrigerant tubes in sealed refrigeration systems has been to align the tubes and manually hold them in position, to heat the tubes to the melting point of solder with an open-flame torch such as an oxygen-acetylene torch, and then to hand feed solder to the joint area. Conventionally, the solder used to make such joints has been a high silver content silver solder which melts at temperatures in the range of 1150° F.–1375° F. Considerable skill is required to make a secure joint in this prior art manner which will not leak so that refrigerant will not escape from the sealed system. Also, since most home appliances are generally quite compact, very little space is available for a service person to make such soldered joints. For instance, in window air conditioners, the tube to tube spacing may be on the order of 5/16 of an inch. Furthermore, by hand feeding solder to a joint area, it is quite possible that the solder will be deposited unevenly so that an excess of solder and flux may enter the sealed system, whereby the compressor may be damaged. Lastly, the uneven deposition of solder may result in microscopic leaks in the joint through which refrigerant may escape from the sealed refrigeration system.

An additional disadvantage of the conventional open-flame method for repairing sealed refrigeration systems is that open-flame repair is not permitted in certain locations, such as high rise apartments. Thus, to repair an appliance, it would have to be removed from the apartment so that it may be repaired in a service shop. This process is not only time consuming and costly and deprives the customer of the appliance for an undesired period of time but may also result in damage to the appliance during its transfer.

A still further disadvantage of the prior art open-flame method for making solder joints is that a low silver content solder cannot be used effectively as the high temperature of the open flame tends to cause evaporation of the tin or lead or both from the soft solder, thereby reducing the effectiveness of the solder material and thus resulting in an unacceptable joint. Conventionally, therefore, high silver content silver solder has been used for making solder joints in sealed refrigeration systems, thus adding further cost to the repair process because of the relatively high price of high silver content solder. In addition, the high temperature of the torch flame tends to soften the refrigerant tubes and causes a relatively high degree of oxidation and scaling, thus potentially resulting in a poor solder joint.

Another prior art method for making solder joints in sealed refrigeration systems has been by the use of an electrically operated apparatus. The structure of one such apparatus is disclosed in U.S. Pat. No. 4,367,397. The apparatus consists of a pair of hinged jaws which are biased in the open position by means of a spring. The jaws of the apparatus must, therefore, be manually held closed by the operator in order to clamp a pair of refrigerant tubes therebetween for soldering. The jaws are secured to a pair of handles so that the operator may grip the handles and squeeze them together to clamp the refrigerant tubes between the jaws. The jaws are also provided with a pair of electrodes which contact the refrigerant tubes. Electric current is then passed through the electrodes whereby the joint area of the refrigerant tubes will be heated. Solder is then fed by hand to the joint area and is melted so that it flows into the tube interface area between the refrigerant tubes to form a joint.

Since soldering of refrigerant tubes requires a relatively large amount of thermal energy, the heat conducted from the joint area through the jaws to the handles will tend to substantially heat up the handles so that they will become too hot to be touched with bare hands. Since the handles must be firmly held by the operator during the soldering process to firmly clamp and position the refrigerant tubes and to ensure good electrical contact, it is desired to dissipate the thermal energy which is conducted through the jaws so that the handles may be kept cool to protect the operator. The prior art tool disclosed in the aforementioned patent is, therefore, provided with large cooling fins which are located between the jaws and the handles to dissipate thermal energy and to prevent the handles from becoming too hot. Such fins add extra cost to the tool and, more importantly, cause the tool to be relatively bulky so that it does not fit in the confined spaces which are encountered in the sealed refrigeration systems of many home appliances. However, even with the provision of such fins, it is often necessary for the operator to wear gloves to operate the prior art soldering apparatus. Furthermore, since the solder is hand fed to the joint area, the above-mentioned disadvantages of hand feeding solder are not solved by the prior art electric soldering apparatus.

It is, therefore, desired to provide a flameless method and apparatus for forming solder joints between two tubes in a refrigeration sealed system which ensures a leakproof, secure solder joint.

SUMMARY OF THE INVENTION

The present invention overcomes the disadvantages of the above-described prior art methods and apparatuses by providing an improved method and apparatus therefor.

The method and apparatus of the present invention, in one form thereof, provides a pair of jaws including a pair of electrodes secured thereto. The jaws are normally held in the closed position by a bias spring. A source of electric power is connected to the electrodes. A pair of tubular members are loosely joined together and are clamped between the jaws, a ring of solder is located closely adjacent the joint, and electric energy is then supplied to the electrodes to heat the joint area and to cause the solder to melt and flow into the interface area between the tubes to form a joint.

The apparatus of the present invention, in one form thereof, further comprises a pair of arms each of which includes a handle and a jaw. The arms are hingedly secured together and are spring biased so that the jaws are biased in the closed position. The jaws include a pair of electrodes having recesses therein in opposed facing relationship so that a pair of tubes may be firmly held between the electrodes by means of the spring bias force. A ring of soft solder is then placed in abutting relationship with the joint area. Electric energy is supplied to the electrodes to cause the tubes to heat up whereby the solder will be melted and will flow between the tubes to form a joint.

One advantage of the method and apparatus according to the present invention is that it eliminates the need for the operator to hold onto the tool during the soldering operation since the spring provides the clamping power. Also, the operator does not need to hand feed solder to the joint area as the solder ring provides all of the needed solder and the proper amount of solder. Thus, a more even distribution of solder results, thereby eliminating the problem of depositing excess solder and potential contamination of the refrigeration sealed system by excess flux and solder. Furthermore, a better joint will result because of the more even distribution of solder around the entire circumference of the joint. Lastly, the operator does not need to be concerned about the fact that the handles may get warm during the soldering operation as he does not need to grip the handles during the soldering operation.

Another advantage of the method according to the present invention is that the method is flameless, thereby eliminating the problems identified above which are inherent in prior art open flame soldering methods.

A further advantage of the apparatus according to the present invention is that heat radiating fins need not be provided on the tool. The tool may, therefore, be made much more compact than prior art flameless electric torches, thereby permitting the use of such torches in small confined spaces such as are found in the refrigeration sealed systems of home appliances.

Still another advantage of the method according to the present invention is that it permits the use of a low temperature, soft solder which includes a relatively small amount of silver, thereby eliminating the need for raising the temperature of the joint to the same level as with the prior art soldering methods thus eliminating excessive oxidation and scaling and resulting in a better, more secure and leakproof solder joint. Furthermore, this also results in a cost savings because of the lower cost of low silver content solder.

The present invention, in one form thereof, comprises a method for joining first and second tube ends by means of solder material and an electrically operated metal bonding tool which includes a pair of electrodes. The first tube end has a diameter which is larger than the diameter of the second tube end. The method comprises placing the smaller tube end inside the larger tube end in telescoping relationship, positioning a ring of solder around the smaller tube end in abutting relationship with the larger tube end, then clamping the joined tube ends in the tool and supplying electric energy to the electrodes to melt the solder so that the solder will flow between the telescoped tube ends.

The present invention, in one form thereof, further comprises an apparatus for bonding two tubular members by soldering. The apparatus includes a pair of hinged jaws and a spring for biasing the jaws in the closed position. Handles are provided for opening the jaws against the spring bias force. A pair of carbon electrodes are secured to the jaws in opposed facing relationship. The electrodes include arcuate recesses which are oriented in opposed facing aligned relationship for gripping a tubular member. A pair of electrical conductors supply electric energy to the electrodes.

The present invention, in one form thereof, still further comprises a metal bonding tool for use in a refrigeration sealed system. The tool includes first and second arms, each arm having a handle portion and a jaw. A hinge is connected to the arms for hingedly securing the arms together. A spring is operably associated with the hinge for biasing the jaws in the closed position. A pair of electrodes is secured to the jaws in opposed facing relationship for receiving therebetween metal objects to be joined.

It is an object of the present invention to provide a method and apparatus for repairing a sealed refrigeration system without the use of an open flame.

Another object of the present invention is to provide a flameless method and apparatus for repairing sealed refrigeration systems in smaller, more confined spaces than has hitherto been possible.

A further object of the present invention is to provide a flameless method and apparatus for making high quality, leakproof solder joints in refrigeration sealed systems which minimizes the introduction of contaminants into the sealed refrigeration system.

Still another object of the present invention is to provide a flameless method and apparatus for making a solder joint whereby the correct amount of solder is used.

Yet another object of the present invention is to provide a flameless method and apparatus for making a solder joint whereby the operator does not need to hold onto the soldering apparatus or hand feed solder to the joint area during the soldering operation.

A still further object of the present invention is to provide a flameless method and apparatus for making a high quality solder joint with a soft, low temperature, low silver content solder.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 4 is an exploded perspective view of the apparatus of FIG. 2;

FIG. 5 is a perspective view of the switch assembly of the apparatus of FIG. 2;

FIG. 8 is a schematic electrical circuit diagram for use in connection with the apparatus of FIG. 2.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
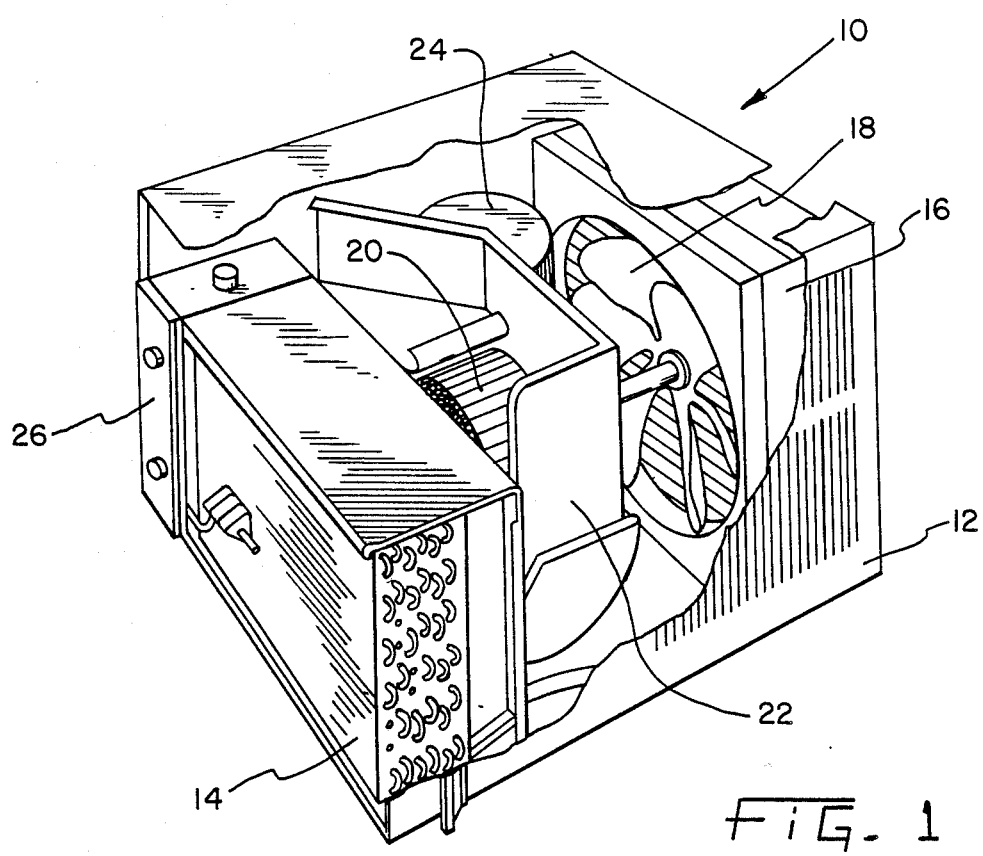
FIG. 1 is a perspective view of an air conditioner with portions of the outer cabinet broken away to disclose the arrangement of the components within the cabinet.

Referring to FIG. 1, a typical room air conditioning apparatus 10 is shown to illustrate the confined spaces in the refrigeration sealed system of a typical home appliance. The cabinet 12 of the air conditioner is partially broken away and the front cover is removed to disclose the spacing of the components which are housed inside outer cabinet 12. The components include an evaporator 14, a condenser 16, a condenser fan 18, and an evaporator fan 20. Condenser fan 18 and evaporator fan 20 are driven by an electric motor (not shown). A dividing wall 22 divides the interior of cabinet 12 into two sections. A control housing 26 is provided on the front of the air conditioner to house the controls for controlling the operation of air conditioner 10. It can be seen that relatively confined and cramped spaces are provided inside cabinet 12 due to the number and spacing of the components. The air conditioner 10 of FIG. 1 is intended for installation in a window or through a wall of a dwelling so that it is desirable to make the unit as compact as possible whereby it uses up as small a space as possible. Thus, the working space available in the refrigeration sealed system of air conditioner 10 for removing a major component such as, for instance, compressor 24, is quite limited. Confined working spaces are not, however, limited to window air conditioners but are also encountered in refrigerators, freezers and dehumidifiers. It is, therefore, desired to provide repair tools which are very compact so that they are usable in the available confined spaces.

Figure 2:
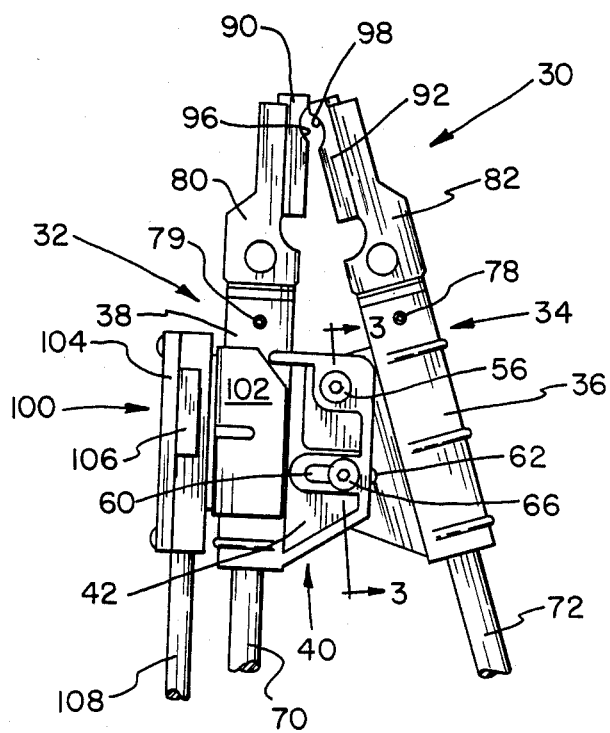
FIG. 2 is an elevational view of the apparatus of the present invention.
Figure 3:
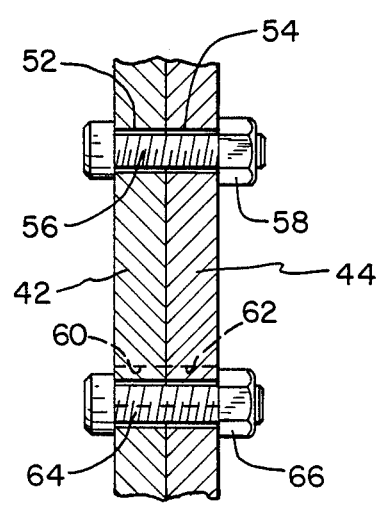
FIG. 3 is a partial sectional view of the hinge of the apparatus taken along line 3—3 of FIG. 2.

Referring now to FIGS. 2-4, an elevational view is shown of a preferred embodiment of the electric soldering apparatus 30 according to the present invention. Apparatus 30 is generally in the form of a pair of tongs or arms 32 and 34. Arms 32 and 34 include handle portions 36 and 38 and are connected by a hinge 40. Arms 32 and 34 may be formed of a heat resistant fiber-reinforced plastic material. Hinge 40 is formed of two integral webs 42 and 44 which are respectively secured to arms 32 and 34. Webs 42 and 44 may also be respectively formed integrally with arms 32 and 34. Web 42 includes a recess 46 and web 44 includes a recess 48. As best seen in FIG. 4, recesses 46 and 48, in the assembled apparatus, are arranged in opposed facing aligned relationship to form a pocket in which a spring 50 is housed. Spring 50 includes an aperture 49 and two legs 51. Web 42 further includes an aperture 52 located in recess 46 and web 44 further includes an aperture 54 located in recess 48. As best seen in FIGS. 3 and 4, a threaded fastener 56 is disposed in apertures 52, 54 and 49 and has a nut 58 threaded thereonto. Thus, legs 51 of spring 50 are engaged with the sides of recesses 46 and 48 and, therefore, urge handle portions 36 and 38 outwardly.

Webs 42 and 44 are also respectively provided with slots 60 and 62 which are disposed in opposed facing aligned relationship and in which a threaded fastener 64 is disposed which has a nut 66 threaded thereonto. Fastener 64 serves as a stop for hinge 40 and, furthermore, provides added strength for hinge 40.

A pair of heavy duty insulated stranded conductors 70 and 72 are disposed in respective axial bores (not shown) of arms 32 and 34. The insulation has been removed from the end portions of conductors 70 and 72. The conductor end portions have secured thereto a pair of cylindrical metallic bodies (not shown). The metallic bodies include axial extensions 74 and 76 as best shown in FIG. 4. The metallic bodies are secured in place in the axial bores of arms 32 and 34 by means of a pair of set screws 78 and 79. A pair of metallic electrode holders 80 and 82 are provided with axial bores for receiving axial extensions 74 and 76. Axial extensions 74 and 76 are secured to electrode holders 80 and 82 by means of a pair of set screws 83 which are received in apertures 81. Insulation discs 84 and 85 are located respectively between electrode holders 80 and 82 and handle portions 36 and 38 to reduce the amount of thermal energy which is transferred from electrode holders 80 and 82 to handle portions 36 and 38. Electrode holders 80 and 82 are provided with grooves 86 and 88 which may be dove-tail shaped and in which are slidingly received a pair of electrodes 90 and 92. Electrodes 90 and 92 are preferably made of a carbon compound and are retained in grooves 86 and 88 by means of a pair of screws 94. Each electrode 90 and 92 is respectively provided with an arcuate recess 96 and 98. The recesses may also be V-shaped or of any other suitable shape for receiving and clamping elements to be soldered.

Further continuing with reference to FIGS. 2 and 5, a switch unit 100 is provided to control the energization of apparatus 30. Switch unit 100 includes a clamp 102 which may be removably snapped over one of the handle portions 36 or 38. Switch unit 100, furthermore, includes a switch block 104 having a push button 106 movably secured therein. An insulated stranded conductor cable 108 is also secured to switch block 104.

Referring now to FIG. 8, a circuit diagram is shown for the operation of apparatus 30. The circuit includes a transformer 114 including a primary winding 116 and a secondary winding 118. Primary winding 116 is connected to a source of alternating voltage 120 such as, for instance, a standard 120 volt supply. Transformer 114 converts the input power to a low voltage, high current supply which is supplied to apparatus 30 by conductors 70 and 72.

Figure 6:
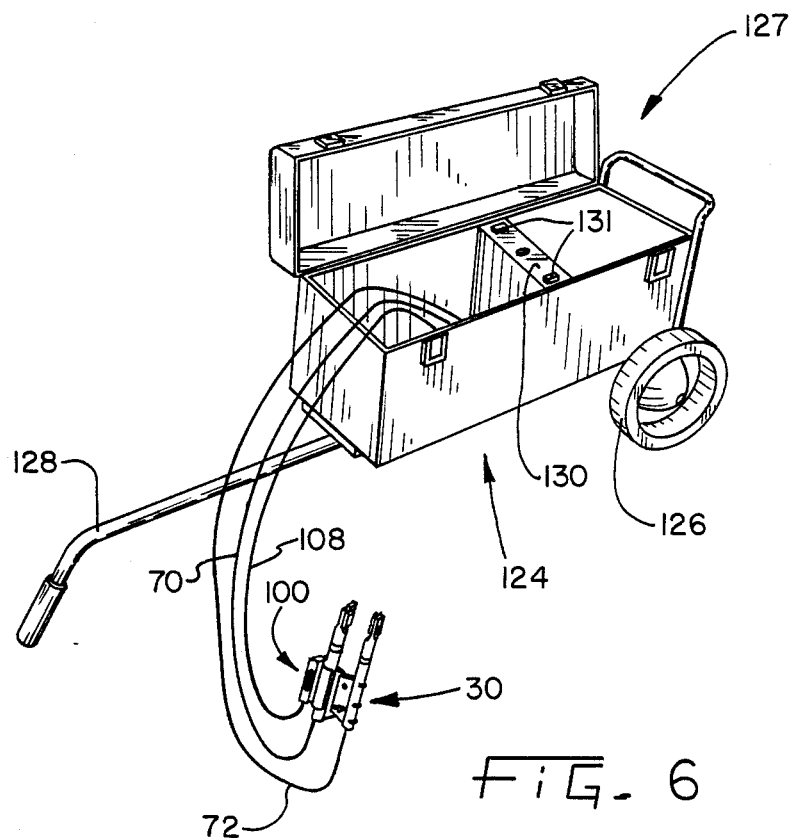
FIG. 6 is a perspective view of a cart and a tool box assembly for the storage of the apparatus of FIG. 2.

Referring now to FIG. 6, the entire soldering apparatus may be housed in a container 124 in the form of a wheeled cart 127 having wheels 126 and a handle 128. Cart 127, furthermore, includes transformer 114 and a control panel 130 including indicator lights 131 for monitoring the operation of soldering apparatus 30.

Figure 7:
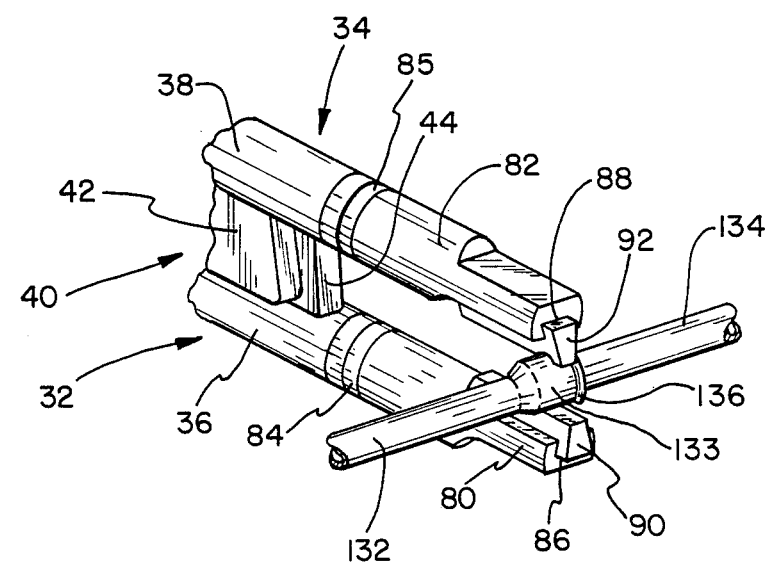
FIG. 7 is a partial perspective view of the apparatus of FIG. 2 with a pair of telescoped tubes clamped between the jaws in preparation for soldering.

Referring now to FIG. 7, the apparatus is shown in use in bonding two refrigerant tubes 132 and 134. Conventionally, such tubes are made of copper or steel. Tube 132 has a flared end 133 which is larger in diameter than tube 134. Thus, tubes 132 and 134 may be telescopically fitted together with the end of tube 134 slidingly received inside flared end 133 of tube 132. Prior to sliding tube 134 into flared end 133, the ends of tubes 132 and 134 are first thoroughly mechanically cleaned such as by wire brushing or by the use of emery paper. Furthermore, a soldering flux is placed on the outer surface of the end of tube 134 in the region where a joint is to be formed. Tube 134 is now telescoped into the flared end of tube 132 so that the flux is located in the interface area between tubes 132 and 134. A solder ring 136 is then moved into abutment against the joint interface as shown.

The solder ring 136 used for forming the joint may be a soft solder such as Staybrite 8, manufactured by J. W. Harris Company of Cincinnati, Ohio. This solder is a high strength silver bearing low temperature solder having a 6% silver content and a 94% tin content and which melts at temperatures in the range of 450° F.–500° F. This solder has a fairly wide solid to liquid transition range which provides good control over the melting and flowing of the solder. However, a solder with a silver content up to 30% would also be acceptable for making a solder joint in a relatively low temperature range with the method and apparatus of the invention. Furthermore, apparatus 30 can also be used with conventional high silver content solder, but the cost advantage of the invention would not be realized. Solder is normally provided in spool form and solder ring 136 may, therefore, be formed by hand from such material. Alternatively, rings 136 could be pre-formed.

The arms 32 and 34 are now clamped onto flared end 133 so that carbon electrodes 90 and 92 are spaced approximately ⅛ inch from the end of tube 132 where solder ring 136 is located. Switch button 106 is now depressed to close switch 122. This will cause the joint area of tubes 132 and 134 to be heated and will melt the flux. The heated flux will further clean the metal in the joint interface area. Switch 122 is then opened for a small period of time while the flux cleans the metal surfaces. Switch 122 is then closed again until solder ring 136 melts. Switch 122 is then reopened. The melted solder will be drawn into the interface area between the tube ends and will solidify as the joint cools. Switch 122 may then be again depressed until the solder melts again so that the operator can see whether bubbling through the solder occurs. Bubbling is an indication that air trapped in the solder is exiting from the joint. When bubbling stops, switch 122 is opened and the tool is allowed to cool and is then removed from the bonded joint.

It can thus be seen that apparatus 30 does not need to be held by the operator while the joint is being soldered since the bias force of spring 50 is sufficient to clamp apparatus 30 onto tubes 132 and 134 and ensures good electrical contact of tubes 132 and 134 with electrodes 90 and 92. Furthermore, the solder does not need to be supplied by hand during the soldering process because solder ring 136 provides all the solder which is needed to form a proper joint. Solder ring 136 provides just enough solder and eliminates the problem of depositing excess solder or flux onto the joint as discussed hereinabove. Thus, what has been provided is a very simple and effective method and apparatus to form a leakproof secure joint between two refrigerant tubes in a refrigeration sealed system and which may be used in confined spaces.

While this invention has been described as having a preferred design and method of operation, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

We claim:

1. A method for joining first and second tube ends by means of solder material and an electrically operated metal bonding tool including a pair of electrodes, the first tube end having a larger diameter than the second tube end, said method comprising:
   placing said second tube end into said first tube end in telescoping relationship;
   positioning a ring of solder around said second tube end in abutting relationship with said first tube end;
   clamping said first and second tube ends in said tool;
   supplying electric energy to said electrodes to melt said solder whereby said solder will flow between said telescoped tube ends;
   discontinuing supplying electric energy to said electrodes until said melted solder solidifies;
   resupplying electric energy to said electrodes only until said solidified solder remelts; and
   discontinuing supplying electric energy to said electrodes.

2. The method of claim 1 including the step of cleaning said tube ends by mechanical means prior to placing said tube ends in said telescoping relationship.

3. The method of claim 1 wherein, prior to said placing step, a soldering flux is applied to at least one of said tube ends.

4. The method according to claim 1 wherein said solder is composed of less than ten percent (10%) silver.

5. A method for repairing a refrigeration sealed system by joining first and second tube ends to form a continuous refrigerant carrying conduit by the use of solder and an electrically heated bonding tool, said bonding tool having two jaws each of which carries an electrode, said jaws normally urged toward each other by a spring, said bonding tool including a remotely located electrical switch for energizing said tool, the first said tube end having a larger diameter than the second said tube end whereby said second tube end may be telescopically received in said first tube end, the method comprising:
   cleaning the inside surface of said first tube end;
   cleaning the outside surface of said second tube end;
   placing flux material on said second tube end;
   placing said second tube end inside said first tube end;
   forming a ring of solder from a solder material such as from a strand or by casting a ring;
   positioning said solder ring around said second tube end in abutting relationship with said first tube end;
   placing said first tube end between said jaws and permitting said spring to urge said jaws toward each other to thereby clamp said first tube end between said jaws;
   closing said electrical switch to energize said bonding tool;
   maintaining said switch closed until said solder ring melts and the melted solder flows between said tube ends;
   opening said electrical switch and permitting said melted solder to solidify;
   reclosing said electrical switch only until said solidified solder remelts; and
   opening said electrical switch.

6. The method according to claim 5 wherein said solder is composed of less than ten percent (10%) silver.

* * * * *